(12) United States Patent
Buchali et al.

(10) Patent No.: US 10,193,658 B2
(45) Date of Patent: Jan. 29, 2019

(54) APPARATUS AND A METHOD FOR A REGENERATIVE NETWORK NODE BETWEEN A FIRST AND A SECOND LINK PORTION

(71) Applicant: Alcatel Lucent, Boulogne Billancourt (FR)

(72) Inventors: Fred Buchali, Stuttgart (DE); Laurent Schmalen, Stuttgart (DE); Roman Dischler, Stuttgart (DE); Lars Dembeck, Stuttgart (DE); Andreas Leven, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/564,893

(22) PCT Filed: Apr. 22, 2016

(86) PCT No.: PCT/EP2016/000670
§ 371 (c)(1),
(2) Date: Oct. 6, 2017

(87) PCT Pub. No.: WO2016/169659
PCT Pub. Date: Oct. 27, 2016

(65) Prior Publication Data
US 2018/0097582 A1 Apr. 5, 2018

(30) Foreign Application Priority Data
Apr. 24, 2015 (EP) .................................... 15305632

(51) Int. Cl.
*H04L 1/00* (2006.01)
*H04B 10/29* (2013.01)

(52) U.S. Cl.
CPC .......... *H04L 1/0045* (2013.01); *H04B 10/29* (2013.01); *H04L 1/0013* (2013.01); *H04L 1/0043* (2013.01)

(58) Field of Classification Search
CPC ... H04L 1/0045; H04L 1/0013; H04L 1/0043; H04B 10/29
See application file for complete search history.

(56) References Cited

U.S. PATENT DOCUMENTS

2006/0127100 A1   6/2006  Frankel et al.
2011/0206022 A1*  8/2011  Grewe .................. H04L 1/0083
                                                            370/338

(Continued)

FOREIGN PATENT DOCUMENTS

EP      1265451      12/2002
EP      1303082       4/2003

*Primary Examiner* — Kyle Vallecillo
(74) *Attorney, Agent, or Firm* — Patti and Malvone Law Group, LLC

(57) ABSTRACT

Embodiments relate to an apparatus for a regenerative network node between a first and a second link portion. The apparatus comprises an input configured to receive, from the first link portion, a signal impaired by the first link portion, the signal including a data packet with a Forward Error Correction (FEC) encoded payload portion and a header portion. The apparatus comprises a signal regeneration unit configured to mitigate signal impairments of the first link portion to provide a regenerated FEC encoded payload portion. The apparatus comprises a processing unit configured to extract destination information in the data packet's header portion. If extracted destination information indicates that the data packet's destination is the regenerative network node, the data packet's regenerated FEC encoded payload portion is forwarded to a decoding unit of the regenerative network node. Else, the data packet's regenerated FEC encoded payload portion is forwarded to the second link portion.

15 Claims, 11 Drawing Sheets

(56) References Cited

U.S. PATENT DOCUMENTS

| | | | |
|---|---|---|---|
| 2013/0227376 A1* | 8/2013 | Hwang | G06F 11/10 |
| | | | 714/776 |
| 2013/0290814 A1* | 10/2013 | Hwang | H04L 1/004 |
| | | | 714/776 |
| 2013/0343750 A1* | 12/2013 | Lanzone | H04L 1/0009 |
| | | | 398/34 |
| 2014/0307734 A1* | 10/2014 | Luby | H04L 12/18 |
| | | | 370/390 |
| 2014/0314157 A1* | 10/2014 | Hwang | H04N 19/89 |
| | | | 375/240.27 |

* cited by examiner

APPARATUS AND A METHOD FOR A REGENERATIVE NETWORK NODE BETWEEN A FIRST AND A SECOND LINK PORTION

Embodiments of the present disclosure relate to an apparatus and a method for a regenerative network node between a first and a second link portion.

BACKGROUND

In some communication networks, e.g., Metropolitan Area Networks (MAN) which connect plural Local Area Networks (LAN), data is transmitted from one point to multiple destination points. This kind of communication is known as point-to-multipoint-communication. The communication networks are very often designed in a star or a ring architecture. In a communication network with star architecture, each network node may be connected to a central node with a point-to-point connection. In a communication network with ring architecture, adjacent network nodes may be connected via a point-to-point connection, respectively, in order to form a closed ring. A special implementation of the ring architecture may be an "open ring", which is often referred to as horseshoe architecture. In a communication network with horseshoe architecture, the first and the last network node (end nodes) may not be connected to each other directly, so that a link connecting the network nodes of the communication network may be arranged in the form of a horseshoe.

Connections between network nodes along the horseshoe-like link, connections between a network node along the horseshoe-like link and an end node of the horseshoe-like link or connections between the end nodes of the horseshoe-like link may be point-to-point connections. However, a point-to-point connection may be less effective since the point-to-point connection may merely be used, if data, for example a data packet, is available for transmission along the specific point-to-point connection. For example, aggregation of data for transmission along a plurality of network nodes may not be possible.

In some communication networks, regenerative network nodes are provided between a first link portion and a second link portion to mitigate signal impairments caused by the first link portion and re-transmit the regenerated signal to the second link portion. In the field of optical communication, these regenerative networks nodes are known as optical communication repeaters and may be provided between two optical communication link portions, e.g., optical fibers. In the field of wireless communication, these regenerative networks nodes are known as wireless relays, which may wirelessly receive and re-transmit, e.g., a radio frequency signal. Conventional regenerative network nodes perform time and power consuming Forward Error Correction (FEC) on a received signal—irrespective of the signal's destination. This may cause high latency and high power consumption in a communication network. Hence, there may be a desire for improved communication.

Document EP 1 303 082 A discloses a method to set up a transparent LAN-to-LAN functionality connection between a first multicustomer source location and a second multicustomer destination location through a RPR data transport network.

In document US 2006/0127100 A1 systems and methods for reconditioning an optical signal by optical-to-electrical converting the signal, recovering clock and data information and performing 3R reconditioning to reamplify, retime and reshape the converted electrical signal is disclosed.

Document EP 1 265 451 A2 discloses an architecture for a photonic transport network.

SUMMARY

Some simplifications may be made in the following summary, which is intended to highlight and introduce some aspects of the various example embodiments, but such simplifications are not intended to limit the scope of embodiments. Detailed descriptions of preferred exemplary embodiments adequate to allow those of ordinary skill in the art to make and use the inventive concepts will follow in later sections.

According to a first aspect of the present disclosure, it is provided an apparatus for a regenerative network node between a first and a second link portion, comprising: an input configured to receive, from the first link portion, a signal impaired by the first link portion, the signal including a data packet with a FEC encoded payload portion and a header portion; a signal regeneration unit configured to mitigate signal impairments of the first link portion to provide a regenerated FEC encoded payload portion; and a processing unit. The processing unit is configured to extract destination information given in the data packet's header portion. If the extracted destination information indicates that the data packet's destination is the regenerative network node, the processing unit is configured to forward the data packet's regenerated FEC encoded payload portion to a decoding unit of the regenerative network node, else, the processing unit is configured to forward the data packet's regenerated FEC encoded payload portion to the second link portion. The apparatus further comprises a reduction unit configured to reduce a number of bits representing the data packet's regenerated FEC encoded payload portion, if the data packet's regenerated FEC encoded payload portion is forwarded to the second link portion.

In some embodiments, the signal regeneration unit may be configured to mitigate the signal impairments without FEC decoding the FEC encoded payload portion.

In some embodiments, the first link portion and the second link portion are optical link portions. The apparatus may comprise an optical-electrical-optical conversion unit configured to convert an optical input signal received from the first optical link portion to an electrical input signal and provide the electrical input signal to the signal regeneration unit, and convert an electrical output signal to an optical output signal for the second optical link portion.

In some embodiments, the optical-electrical-optical conversion unit may be configured to provide, to the second optical link portion, the optical signal with a wavelength different from a wavelength of the optical signal received from the first optical link portion.

In some embodiments, an FEC encoded symbol of the data packet's regenerated FEC encoded payload portion is represented by a soft value. The reduction unit may be configured to determine a hard value for the FEC encoded symbol by comparing the soft value to a threshold. In some embodiments, the reduction unit may be configured to limit an amplitude of the soft value to a predefined maximum value.

In some embodiments, the header portion is an FEC encoded header portion. The processing unit may be configured to extract the destination information given in the FEC encoded header portion using FEC decoding. The apparatus may be configured to provide the extracted destination information related to the regenerated FEC encoded payload portion before or simultaneously to the regenerated FEC encoded payload portion.

In some embodiments, if the data packet included in the signal received from the first link portion is empty, the apparatus may be configured to provide, to the second link portion in a time frame associated to the empty data packet, a data packet provided via the regenerative network node with an FEC encoded payload portion and a header portion. If the extracted destination information indicates that the destination of the data packet included in the signal received from the first link portion is the regenerative network node, the apparatus may be configured to provide, to the second link portion in a time frame associated to the data packet included in the signal received from the first link portion, a data packet provided via the regenerative network node with an FEC encoded payload portion and a header portion.

In some embodiments, the destination information is given in a first format in the header portion of the data packet included in the signal received from the first link portion. The apparatus may further comprise a header unit configured to convert a destination information given in a second format, which is different from the first format, in a header portion of a data packet for the second link portion to the first format and FEC encode the header portion of the data packet for the second link portion.

In some embodiments, the apparatus may be configured to modulate a data packet for the second link portion with a modulation scheme different from a modulation scheme of the signal received from the first link portion.

According to a second aspect of the present disclosure, it is provided an apparatus for a regenerative network node between a first and a second link portion, comprising: an input configured to receive, from the first link portion, a signal impaired by the first link portion, the signal including a data packet with a FEC encoded payload portion and a header portion; a signal regeneration unit configured to mitigate signal impairments of the first link portion to provide a regenerated FEC encoded payload portion; and a processing unit. The processing unit is configured to extract destination information given in the data packet's header portion. If the extracted destination information indicates that the data packet's destination is the regenerative network node, the processing unit is configured to forward the data packet's regenerated FEC encoded payload portion to a decoding unit of the regenerative network node, else, the processing unit is configured to forward the data packet's regenerated FEC encoded payload portion to the second link portion. The signal regeneration unit is configured to provide the regenerated FEC encoded payload portion with less mitigated signal impairments, if the data packet's regenerated FEC encoded payload portion is forwarded to the second link portion, compared to the case where the extracted destination information indicates that the data packet's destination is the regenerative network node.

According to a third aspect of the present disclosure, it is provided a network system for transmitting a signal including a data packet with a FEC encoded payload portion and a header portion, comprising: a core network; an intermediate network comprising two or more regenerative network nodes including a respective apparatus according to the first aspect or the second aspect of the present disclosure. The regenerative network nodes are connected in series via link portions and a first network node and a last network node of the series of regenerative network nodes is connected to the core network via a link portion, respectively. At least one of the regenerative network nodes comprises a decoding unit configured to provide a decoded payload portion by FEC decoding a regenerated FEC encoded payload portion forwarded to the decoding unit by the apparatus. The at least one regenerative network node is further connected to an associated access network and is configured to provide the decoded payload portion to the associated access network.

According to a fourth aspect of the present disclosure, it is provided a method for a regenerative network node between a first and a second link portion. The method comprises receiving, from the first link portion, a signal impaired by the first link portion, the signal including a data packet with a FEC encoded payload portion and a header portion; mitigating signal impairments of the first link portion to provide a regenerated FEC encoded payload portion; extracting destination information given in the data packet's header portion; and, if the extracted destination information indicates that the data packet's destination is the regenerative network node, forwarding the data packet's regenerated FEC encoded payload portion to a decoding unit of the regenerative network node, else, forwarding the data packet's regenerated FEC encoded payload portion to the second link portion. The method further comprises reducing a number of bits representing the data packet's regenerated FEC encoded payload portion, if the data packet's regenerated FEC encoded payload portion is forwarded to the second link portion.

According to a fifth aspect of the present disclosure, it is provided a method for a regenerative network node between a first and a second link portion. The method comprises receiving, from the first link portion, a signal impaired by the first link portion, the signal including a data packet with a FEC encoded payload portion and a header portion; mitigating signal impairments of the first link portion to provide a regenerated FEC encoded payload portion; extracting destination information given in the data packet's header portion; and, if the extracted destination information indicates that the data packet's destination is the regenerative network node, forwarding the data packet's regenerated FEC encoded payload portion to a decoding unit of the regenerative network node, else, forwarding the data packet's regenerated FEC encoded payload portion to the second link portion. The regenerated FEC encoded payload portion is provided with less mitigated signal impairments, if the data packet's regenerated FEC encoded payload portion is forwarded to the second link portion, compared to the case where the extracted destination information indicates that the data packet's destination is the regenerative network node.

According to a sixth aspect of the present disclosure, it is provided a computer program having a program code for performing the method according to the fourth aspect or the method according to the fifth aspect, when the computer program is executed on a computer or processor.

Some embodiments may comprise analog and/or digital circuitry installed within the apparatuses for performing the respective methods. Digital control circuitry, e.g., a DSP, an FPGA, an ASIC, or a general purpose processor, needs to be programmed accordingly. Hence, yet further embodiments also provide a computer program having a program code for performing embodiments of the encoding/decoding methods, when the computer program is executed on a computer or a programmable hardware device.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
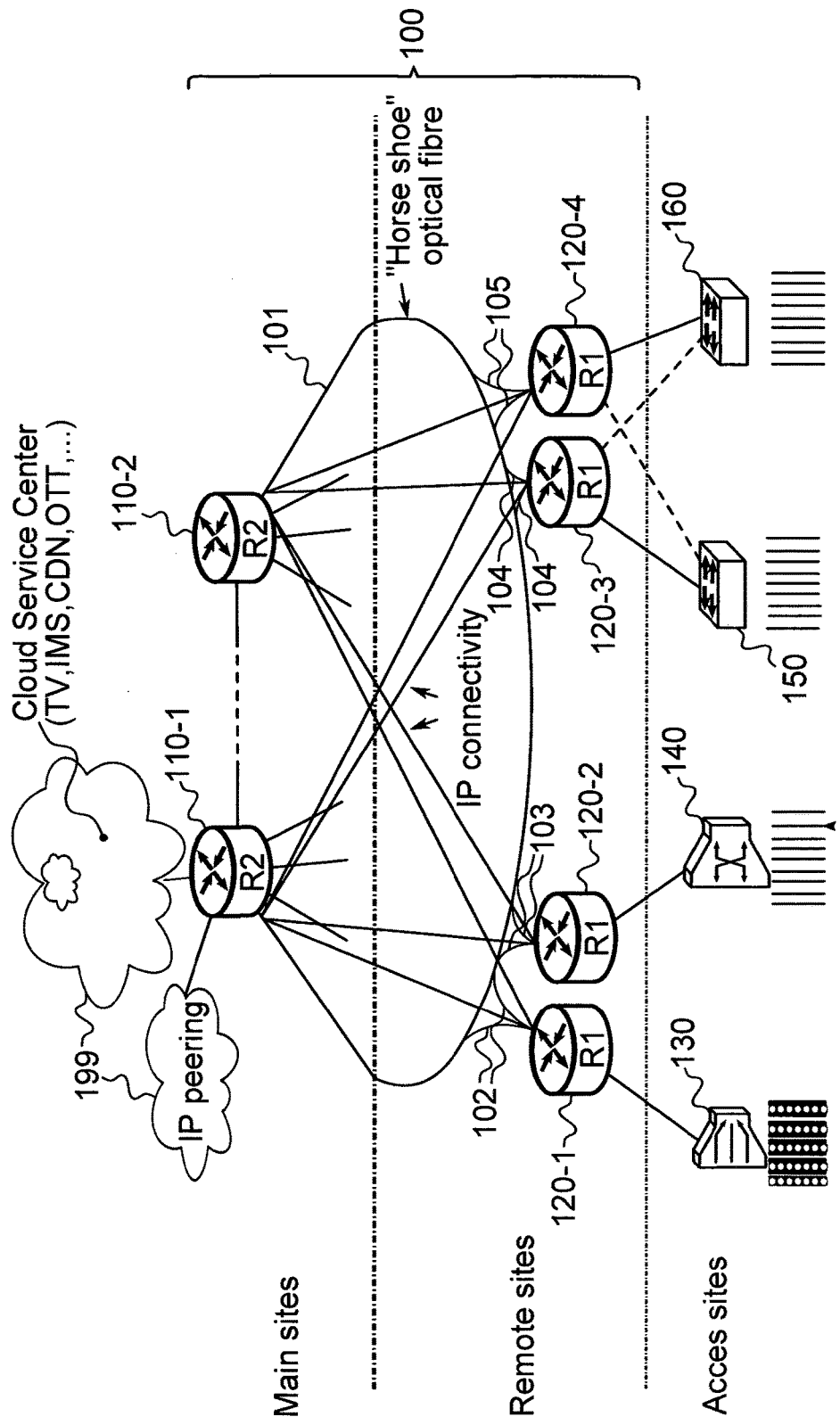
FIG. 1 illustrates a communication network with horseshoe architecture.

FIG. 1 illustrates a communication network 100 having a horseshoe architecture. The communication network 100 may, e.g., be a MAN.

First network nodes 110-1, 110-2 connect the communication network 100 with a network 199. The network 199 may, e.g., comprise the internet, a service network or a data cloud of a service provider. The first network nodes 110-1, 110-2 may, e.g., comprise routing devices. Routing devices may forward data packets between different networks. The first network nodes 110-1, 110-2 may, e.g., be located at a data center of a service provider.

The communication network 100 further comprises second network nodes 120-1, 120-2, 120-3, 120-4, . . . , 120-n. The second network nodes 120-1, 120-2, 120-3, 120-4 are arranged along a link 101, which connects the first network nodes 110-1, 110-2. The link 101 may, e.g., comprise an optical fiber, a wire line or a wireless link. The link 101 may be provided in a horseshoe architecture as illustrated in FIG. 1.

The second network nodes 120-1, 120-2, 120-3, 120-4 are connected to the link 101 via link connections 102, 103, 104, 105, respectively. The second network nodes 120-1, 120-2, 120-3, 120-4 connect a plurality of access networks 130, 140, 150, 160 to the communication network 100. The access networks 130, 140, 150, 160 may be networks which connect subscribers to their immediate service provider. For example, the access networks 130, 140, 150, 160 may comprise a (local) Digital Subscriber Line (DSL) network, a mobile communications network, Gigabit Passive Optical Network (GPON) or an optical network. The second network nodes 120-1, 120-2, 120-3, 120-4 may comprise routing devices. The second network nodes 120-1, 120-2, 120-3, 120-4 may, e.g., be located remote from the first network nodes 110-1, 110-2. Hence, the second network nodes 120-1, 120-2, 120-3, 120-4 may allow to connect the access networks 130, 140, 150, 160 to the network 199 via the link 101.

A connection between two respective second network nodes 120-1, 120-2, 120-3, 120-4, e.g., a connection between the second network nodes 120-2 and 120-3, is conventionally a point-to-point connection. Furthermore, a connection between one of the second network nodes 120-1, 120-2, 120-3, 120-4 and one of the first network nodes 110-1, 110-2, e.g., a connection between second network node 120-1 and the first network node 110-1, is conventionally a point-to-point connection. Also a connection between the first network nodes 110-1 and 110-2 is conventionally a point-to-point connection.

For each point-to-point connection a separate wavelength is conventionally used for an optical connection between the respective network nodes. That is, a plurality of optical signals having different wavelengths is transmitted along the optical link 101. Dummy load is transmitted along the optical link 101 by each point-to-point connection, if no payload is to be transmitted. Hence, a remarkable amount of network traffic along the optical link 101 may be dummy traffic.

Aggregation of payload for different first and/or second network nodes is not possible since separate wavelengths are used for transmitting data to a certain network node.

In other words, data are transmitted from one point to multiple destinations in metro networks. Typically star or ring architectures are applied. In more recent architectures the horseshoe concept of FIG. 1 has been proposed where all clients are located along the horseshoe like fiber route, but the individual connections are built as point to point connections. These individual connections are connections between all second network nodes, respectively, between all second network nodes and the first network nodes and connections between the first network nodes. In networks targeting packet transmission simple point to point connections are less effective because each connection is used only if a packet is available for transmission. Aggregation of traffic targeted for transmission along a direction is impossible.

A bus architecture, i.e., a network that transfers data between a plurality of nodes along a common transmission path, may be implemented in order to increase an efficiency of the horse-shoe like network 100. The second network nodes 120-1, 120-2, 120-3, 120-4 may, e.g., be implemented as regenerative network nodes. For example, the second network node 120-1 may receive a signal via the optical link 101 from the first network node 110-1 and mitigate signal impairments caused by the optical link 101 between the first network node 110-1 and the second network node 120-1. The second network node 120-1 may either forward the regenerated signal to the access network 130 or via the optical link 101 to another second network node 120-2, 120-2, 120-4 or the other first network node 110-2. However, a conventional regenerative network node performs time and power consuming FEC on the received signal—irrespective of the signal's destination. This causes high latency and high power consumption in the communication network 100.

Examples described within the present disclosure may provide improved data transmission within a network.

Figure 2:
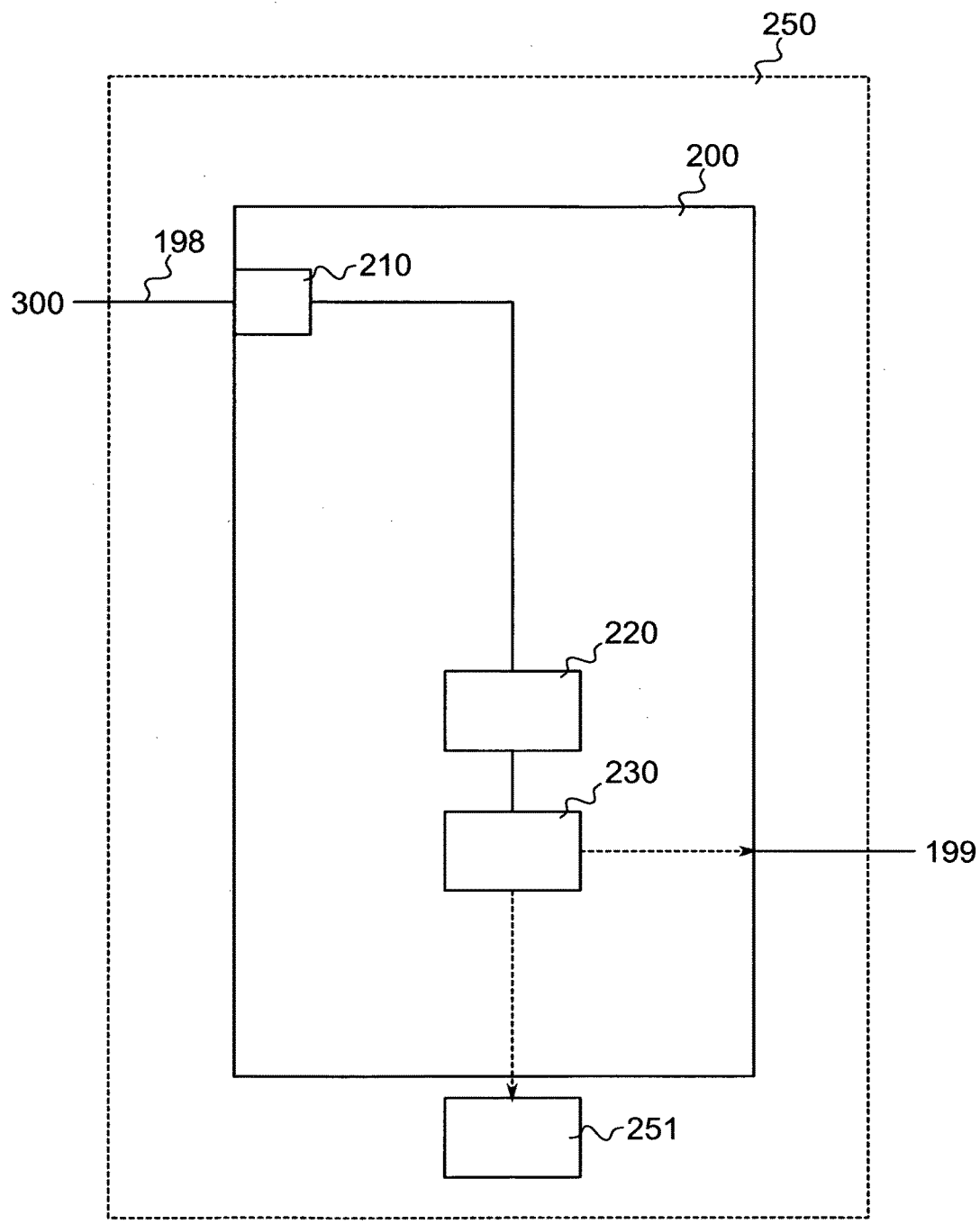
FIG. 2 illustrates an example of an apparatus for a regenerative network node between a first and a second link portion.

FIG. 2 illustrates an example of an apparatus 200 for a regenerative network node 250 between a first and a second link portion 198, 199. The apparatus comprises an input 210. The input 210 receives a signal 300 from the first link portion 198. The input 210 may correspond to an interface for receiving information, which may be in (bit) values according to a specified code, within a module, between modules or between modules of different entities. The signal includes a data packet with a FEC encoded payload portion and a header portion.

Figure 3:
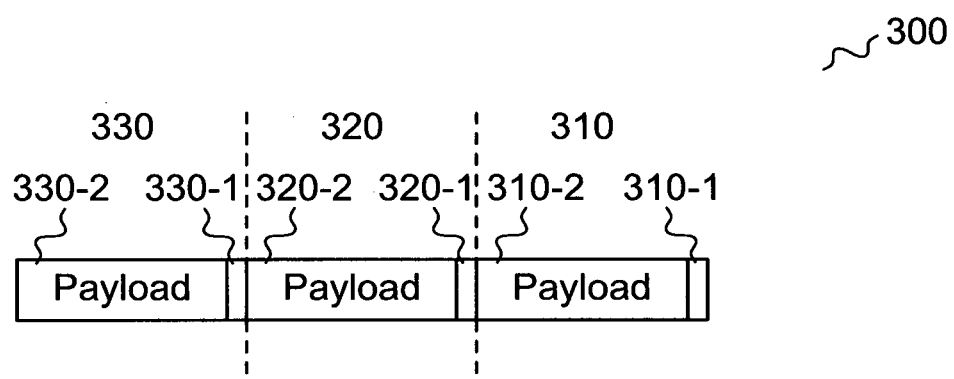
FIG. 3 illustrates an example of a signal received by the example of an apparatus illustrated in FIG. 2.

An example of a signal 300 is illustrated in FIG. 3. The signal 300 comprises at least one data packet 310, 320, 330. The data packets 310, 320, 330 may be arranged serially in the signal 300. The data packet 310, 320, 330 comprises the FEC encoded payload portion 310-2, 320-2, 330-2 and the header portion 310-1, 320-1, 330-1.

The FEC encoded payload portion 310-2, 320-2, 330-2 may contain data to be transmitted to a network node. The FEC encoded payload portion 310-2, 320-2, 330-2 is encoded in a redundant way using a FEC code. For example, a block code, a Low-Density Parity Check (LDPC) code, a convolutional code or a turbo code may be used to encode the payload portion. The redundancy may allow a receiver of the data packet 310, 320, 330 to detect errors in the FEC encoded payload portion 310-2, 320-2, 330-2 and to correct these errors without retransmission of data packet 310, 320, 330.

The FEC encoded payload portion 310-2, 320-2, 330-2 may contain one or more FEC encoded symbols. A symbol may be a pulse representing an integer number of bits. For example, the FEC encoded payload portion 310-2, 320-2, 330-2 may contain one or more Ethernet packets according to the Institute of Electrical and Electronics Engineers (IEEE) definition 802.3-2012.

The header portion 310-1, 320-1, 330-1 contains destination information on the data packet's destination. The destination information may be given in a first format. For example, the first format may comprise a local address of a regenerative network node, which is the data packet's destination. The header portion 310-1, 320-1, 330-1 may contain further information, e.g., control information. For example, the header portion 310-1, 320-1, 330-1 may contain information on the data packet's origin. Furthermore, the header portion 310-1, 320-1, 330-1 may be FEC encoded. The code used for FEC encoding the header portion 310-1, 320-1, 330-1 may be a same code or a different code as the code used for FEC encoding the payload portion.

Furthermore, the signal 300 may be modulated. For example, Dual-Polarization Quadrature phase-shift keying (DP-QPSK) or Dual-Polarization Quadrature amplitude modulation (DP-QAM) may be used to modulate the signal 300. For example, DP-8 QAM or DP-16 QAM may be used to modulate the signal 300.

In other words, the data targeted for transmission are packets or containers with a header containing information on destination or others. The packets may be concatenated serially and sample synchronous. The packet or container may contain one or multiple Ethernet packets. The coding of the payload may differ from the coding of the header. Complex modulation formats, e.g., DP-QPSK or DP-16 QAM, may be applied.

The signal 300 received at the input 210 as illustrated in FIG. 2 may be impaired by the first link portion 198. That is, the original wave form of the signal 300 may be impaired due to errors or characteristics of the first link portion 198. The first link portion 198 may be a wired or a wireless link. That is, the first link portion 198 may, e.g., be a radio frequency link, an electrical wire link or an optical link. For example, the first link portion 198 may be an optical fiber. The optical fiber may cause linear and non-linear impairments to the signal 300.

The linear impairments may, e.g., comprise attenuation, chromatic dispersion or polarization mode dispersion. Attenuation may cause decay of a signal strength, loss of light power as the signal propagates through the fiber. Attenuation in an optical fiber may be caused by intrinsic factors which are scattering, and absorption and by extrinsic factors which include stress from a manufacturing process, environmental and physical bending. Light pulses representing data have a definite spectral width. Because of chromatic dispersion in an optical fiber different wavelengths may propagate at different speeds and cause pulse spreading. Pulse spreading may result in inter-symbol interference, when adjacent pulses overlap, leading to errors in a recovery of transmitted bits. Polarization mode dispersion is a form of modal dispersion where two different polarizations of light in a waveguide, which normally travel at the same speed, travel at different speeds due to random imperfections and asymmetries, causing random spreading of optical pulses.

The non-linear impairments may, e.g. comprise self-phase modulation or stimulated Brillouin scattering. Self-phase modulation is a nonlinear optical effect of light-matter interaction. An ultrashort pulse of light, when travelling in a medium, may induce a varying refractive index of the medium due to the optical Kerr effect. This variation in refractive index may produce a phase shift in the pulse, leading to a change of the pulse's frequency spectrum. For intense beams travelling in an optical fiber, the variations in the electric field of the beam itself may produce acoustic vibrations in the medium via electrostriction or radiation pressure. The beam may undergo Brillouin scattering from these vibrations, usually in opposite direction to the incoming beam. As a result, shorter wavelengths may amplify longer wavelengths by depleting themselves. Further nonlinear degradations, which are based on same physical effects, may occur due to surrounding channels in Wavelength Division Multiplex (WDM) systems.

Hence, the apparatus 200 comprises a signal regeneration unit 220. The signal regeneration unit 220 mitigates signal impairments of the first link portion 198 to provide a regenerated FEC encoded payload portion. For example, the FEC encoded payload portion may be input as an electrical signal to the signal regeneration unit 220 and the signal regeneration unit 220 may process the electrical signal in order to compensate for the impairments of the first link portion 198.

For example, the signal regeneration unit 220 may compensate chromatic dispersion using, e.g., a FIR filter or a least mean square adaptive filter. Moreover, the signal regeneration unit 220 may perform channel estimation using, e.g., blind channel estimation techniques, which uses statistics of the signal input to the signal regeneration unit 220. The signal regeneration unit 220 may further polarization de-multiplex the FEC encoded payload portion. The signal regeneration unit 220 may, e.g., estimate a frequency offset of the FEC encoded payload portion and correct the FEC encoded payload portion for the estimated frequency offset. Furthermore, the signal regeneration unit 220 may estimate a phase offset of the FEC encoded payload portion using, e.g., a local oscillator. The signal regeneration unit 220 may recover the phase of the FEC encoded payload portion using the estimated phase offset.

Furthermore, the signal regeneration unit 220 may amplify the FEC encoded payload portion in order to compensate attenuation related to the first link portion 198. The signal regeneration unit 220 may further re-time the FEC encoded payload portion, i.e., the FEC encoded payload portion is provided with a new timing, which may be estimated in a timing recovery process or be provided by a clock.

The signal regeneration unit 220 may compensate or mitigate all or at least part of the impairments of the first link portion 198. The signal regeneration unit 220 mitigates the signal impairments without FEC decoding the data packet's FEC encoded payload portion.

The signal regeneration unit 220 may optionally mitigate signal impairments of the first link portion 198 in the header portion to provide a regenerated header portion. The signal regeneration unit 220 may optionally de-modulate the header portion and/or the FEC encoded payload portion.

The apparatus 200 further comprises a processing unit 230. The data packet's (regenerated) header portion and the regenerated FEC encoded payload portion are provided to the processing unit 230. The processing unit 230 extracts the destination information given in the data packet's (regenerated) header portion. Furthermore, the processing unit 230 uses the destination information given in the data packet's header portion to decide to which element the regenerated FEC encoded payload portion is forwarded.

If the extracted destination information indicates that the data packet's destination is the regenerative network node 250, the processing unit 230 forwards the data packet's regenerated FEC encoded payload portion to a decoding unit 251 of the regenerative network node 250. The decoding unit 251 may FEC decode the regenerated FEC encoded payload portion. Else, the processing unit 230 forwards the data packet's regenerated FEC encoded payload portion to the second link portion 199. Optionally, the processing unit 230 may further forward the header portion related to the data packet's regenerated FEC encoded payload portion to the second link portion 199. Hence, a data packet including the (regenerated) header portion and the regenerated FEC encoded payload portion may be provided to the second link portion 199.

The apparatus 200 may allow to drop the data packet included the signal 300 to the regenerative network node 250, if the data packet's destination is the regenerative network node 250, or to forward the data packet to another node connected to the second link portion 199 in all other cases. Independent from the data packet's destination, impairments in the FEC encoded payload portion are mitigated in order to provide the regenerated FEC encoded payload portion. That is, a regenerated payload portion is provided to either the decoding unit 251 or the second link portion 199. Accordingly, the apparatus 200 may be used in a network having a bus architecture.

The regenerated FEC encoded payload portion is merely FEC decoded, if it is forwarded to the decoding unit 251 of the regenerative network node 250. If the regenerated FEC encoded payload portion is provided to the second link portion 199, it is not FEC decoded. FEC decoding may be time- and power-consuming. Accordingly, forwarding the regenerated FEC encoded payload portion to the second link 199 without FEC decoding it may reduce a processing time of the data packet in the apparatus 200. Hence, e.g., a latency of a network using bus architecture may be reduced. Furthermore, power consumption related to forwarding of the data packet in the apparatus 200 may be reduced.

In other words, header processing may be applied to decide for either dropping or forwarding of the packet. At least a header processing may be performed to decide whether the packet is dropped or forwarded. Comprehensive signal processing for signal regeneration may be performed due to signal modulation. FEC is omitted in the forwarding path and applied only, if the packet is dropped. The omission of the FEC at intermediate forwarding may reduce latency and power consumption.

Figure 4:
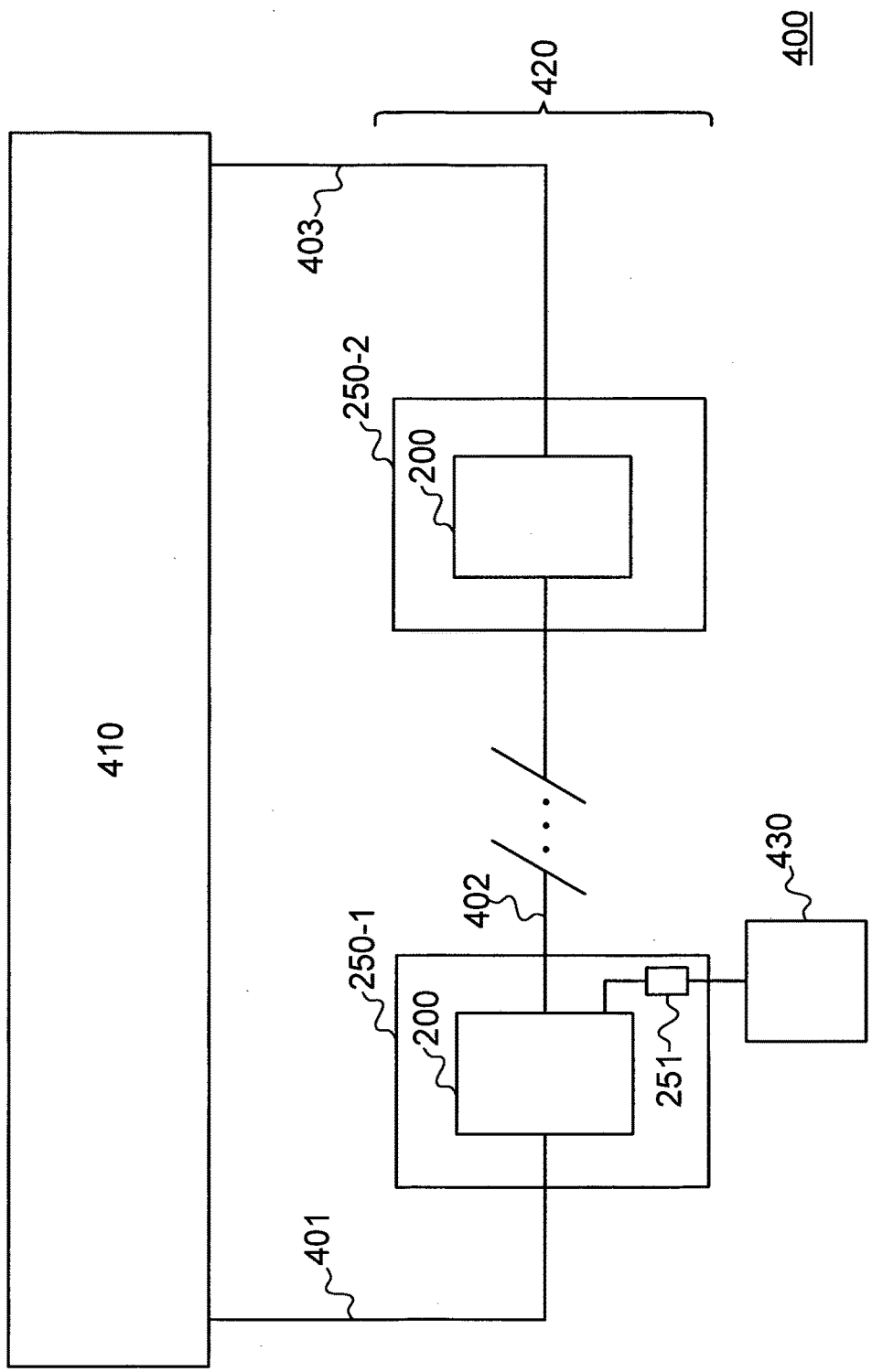
FIG. 4 illustrates an example of a network system for transmitting a signal including a data packet with a FEC encoded payload portion and a header portion.

An example of a network system 400 for transmitting a signal including a data packet with a FEC encoded payload portion and a header portion is illustrated in FIG. 4.

The network system 400 comprises a core network 410. The core network 410 may, e.g., comprise the internet, a service network or a data cloud of a service provider.

The network system 400 further comprises an intermediate network 420 comprising two or more regenerative network nodes 250-n including a respective example of an apparatus 200 as illustrated in FIG. 2. The regenerative network nodes 250 are connected in series via link portions 402. A first network node 250-1 and a last network node 250-2 of the series of regenerative network nodes 250 is connected to the core network 410 via a link portion 401, 402, respectively.

The regenerative network node 250-1 comprises a decoding unit 251. The decoding unit 251 provides a decoded payload portion by FEC decoding a regenerated FEC encoded payload portion forwarded to the decoding unit 251 by the apparatus 200. At least one of the regenerative network nodes 250-1, 250-2 comprises a decoding unit 251.

The regenerative network node 250-1 is further connected to an associated access network 430. The access networks 430 may, e.g., comprise a (local) DSL network, a mobile communications network, GPON or an optical network. The regenerative network node 250-1 provides the decoded payload portion to the associated access network 430.

The apparatus 200 may allow a bus architecture for the network 400. For example, the core network 410 may transmit a signal to the apparatus 200 included in the regenerative network node 250-1. The signal may include a first data packet and a second data packet. The apparatus 200 may either forward the data packets to the decoding unit 251 of its regenerative network node 250-1 or forward the data packets to link portion 402 depending on the destination information given in the header portion of the data packets, respectively. For example, the destination information extracted from the header portion of the first data packet may indicate that the data packet's destination is the regenerative network node 250-1. Accordingly, the processing unit 230 of apparatus 200 forwards the data packet's regenerated FEC encoded payload portion to the decoding unit 251 of the regenerative network node 250-1. The destination information extracted from the header portion of the second data packet may indicate that the data packet's destination is not the regenerative network node 250-1. For example, the destination information extracted from the header portion may indicate that the data packet's destination is the regenerative node 250-2. Accordingly, the processing unit 230 of apparatus 200 forwards the data packet's regenerated. FEC encoded payload portion to the link portion 402. The processing unit 230 of apparatus 200 may further forward the header portion of the second data packet to the link portion 402, so that the header portion and the regenerated FEC encoded payload portion may be transmitted via the link portion 402 to the regenerative network node 250-2 as a new or regenerated data packet.

The bus architecture may, e.g., allow aggregation of data to be transmitted. Referring to the above example, data for a plurality of regenerative network nodes 250-1, 250-2, . . . , 250-n may be aggregated and transmitted by, e.g., the core network 410 using one common signal. Each regenerative network node 250-1, 250-2, . . . , 250-n including an apparatus 200 may forward data packets having a destination different from the respective regenerative network node and drop data packets destined to the respective regenerative network node.

In an embodiment, where the regenerative network nodes 250-1, 250-2, . . . , 250-n are connected via optical links, separate optical links may be established between the regenerative network node 250-1, 250-2, . . . , 250-n, respectively, and between the first and the last regenerative network node 250-1, 250-2 of the series of regenerative network node 250-1, 250-2, . . . , 250-n and the core network 410, respectively. Each optical link may use a separate wavelength and/or a separate modulation scheme for the data. The wavelength and the separate modulation of the respective link may be adapted to specific characteristics of the link, e.g., to a length of the optical link. Moreover, each optical link may use a same or a separate bit rate for data transmission. In some embodiments, the bit rate may be a same or similar for two or more of the link portions. For example, consecutive link portions connected to the regenerative node 250-1, 250-2, . . . , 250-n as first link portion and second link portion may have equal bit rates, similar bit rates or bit rates which deviate, e.g., by 5%. Accordingly, an apparatus 200 comprised in the regenerative network node 250-1, 250-2, . . . , 250-n may adapt a bit rate of a data packet to be provided to the second link portion.

Moreover, a single wavelength may be used in an optical link for transmitting data with different destinations, since a subsequent regenerative network node 250-1, 250-2, . . . , 250-n including an apparatus 200 may either forward or drop data packets based on the destination information given in the data packets' header portion. Transmission of dummy payload may be reduced compared to a point-to-point network using a plurality of different wavelengths for the individual point-to-point connections as, e.g., illustrated in FIG. 1. Hence, an overall traffic of the network 400 may be reduced compared to the network 100 illustrated in FIG. 1.

The network system 400 may further allow data transmission over long distances, since impairments related to a link portion are mitigated in the apparatus 200 of a regenerative network node 250-1, 250-2, . . . , 250-n connected to the link. Accordingly, a signal transmitted along a plurality of regenerative network node 250-1, 250-2, . . . , 250-n including an apparatus 200 may be regenerated in each apparatus 200. Transmission errors may thus be compensated at each regenerative network node 250-1, 250-2, . . . , 250-n.

A latency of the network system 400 may be comparatively low, since a data packet's regenerated FEC encoded payload portion is forwarded to a second link portion by the apparatus 200 without time-consuming FEC decoding and subsequent encoding. The omission of FEC decoding may further allow to reduce a power consumption required for forwarding of data, so that an overall power consumption of the network system 400 may be comparatively low. Compared to a network using conventional regenerative network nodes, e.g., network 100 illustrated in FIG. 1, latency and power consumption may be reduced in the network system 400.

In other words, a bus architecture may be provided, where dropping and forwarding in each intermediate node is possible. FEC may be omitted in the forwarding path and applied only, if the packet is dropped. The omission of the FEC at intermediate forwarding may reduce latency and power consumption.

Figure 5:
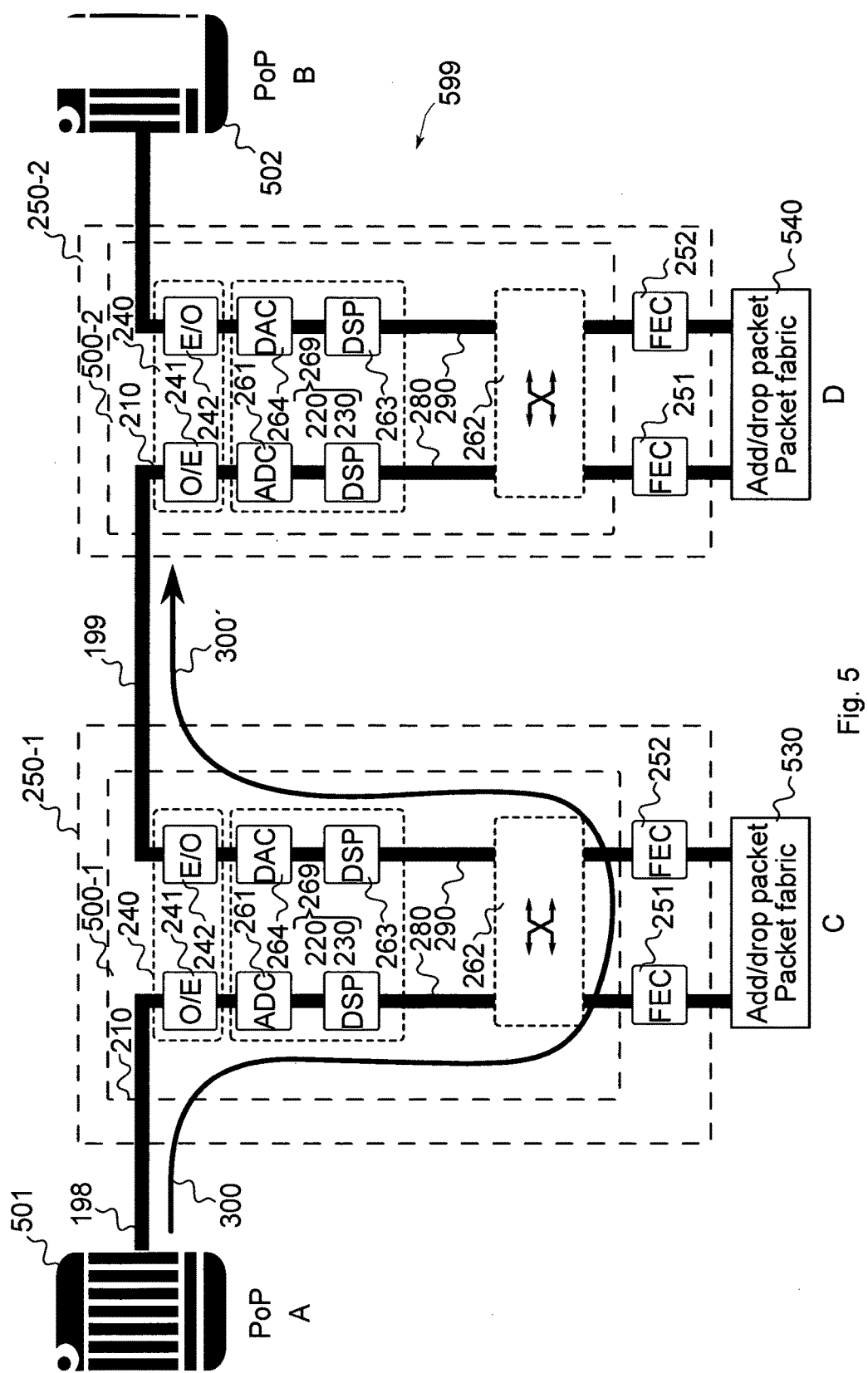
FIG. 5 illustrates an example of a communication network comprising examples of an apparatus.

FIG. 5 illustrates an example of a communication network 599 comprising examples of an apparatus 500-1, 500-2. The apparatus 500-1, 500-2 is to some extent similar to the apparatus 200 illustrated in FIG. 2. However, the apparatus 500-1, 500-2 may comprise further optional elements.

The communication network 599 may, e.g., be an optical transmission network between two Points of Presence (PoP) 501, 502. The PoPs 501, 502 may for example be routers for optical signals at locations A and B. An optical signal 300 containing a data packet with a FEC encoded payload portion and a header portion may be transmitted from PoP 501 via a first optical link portion 198 and may be received by the apparatus 500-1 included in regenerative network node 250-1. The signal 300 may, e.g., be identical to the signal illustrated in FIG. 3. The header portion includes destination information indicating the data packet's destination. For example, the destination information may indicate the data packet's destination is another regenerative network node 250-2 or the PoP 502. The other regenerative network 250-2 may include an apparatus 500-2. As illustrated in FIG. 5, the apparatus 500-1 and the apparatus 500-2 may be constituted of identical elements. However, both apparatuses 500-1, 500-2 may alternatively be constituted of different elements, wherein both apparatuses 500-1, 500-2 comprise at least the elements included in the apparatus 200 as illustrated in FIG. 2.

The apparatus 500-1 comprises an Optical-Electrical-Optical conversion unit (OEO) 240. The optical signal 300 is received by the input 210 and provided to the OEO 240 which comprises an Optical-Electrical converter (O/E) 241 for incoming signals and an Electrical-Optical converter (E/O) 242 for outgoing signals. O/E 241 may convert an optical input signal into an analog electrical signal. E/O 242 may convert an analog electrical output signal into an optical signal and output the optical signal to an optical transmission line 199, such as an optical fiber. OEO 240 may convert the received optical signal 300 into an inbound analog electrical signal, which may be input to an Analog-to-Digital converter (ADC) 261 of the apparatus 500-1.

The ADC 261 may convert the inbound analog electrical signal into an inbound digital electrical signal, which may be input to the signal regeneration unit 220. The signal regeneration unit 220 provides a regenerated FEC encoded payload portion by mitigating signal impairments of the first optical link portion 198. Examples for impairments of the first optical link portion 198 and processes for mitigating these impairments are explained, e.g., in connection with FIG. 2. Furthermore, the processing unit 230 extracts destination information given in the data packet's header portion. Details of the processing unit 230 are, e.g., discussed in connection with FIG. 2. In the example illustrated in FIG. 2, the signal regeneration unit 220 and the processing unit 230 are implemented as a combined single unit, namely as a Digital Signal Processor (DSP) 269.

The processing unit 230 forwards the data packet's regenerated FEC encoded payload portion to a decoding unit 251 of the regenerative network node 250-1, if the extracted destination information indicates that the data packet's destination is the regenerative network node 250-1. The FEC decoding unit 251 may perform FEC decoding on the data packet's regenerated FEC encoded payload portion in order to detect and correct for errors in the data packet.

FEC is typically discriminated into soft-decision FEC and hard-decision FEC. In soft-decision FEC, an error corrected (decoded) output value may take on a whole range of values in-between a fixed set of possible values. On the contrary, in hard-decision FEC, the error corrected (decoded) output value may only take one value of the fixed set of possible values. Due to the variety of possible values for the error corrected output values, soft-decision FEC (decoding) may allow for higher error-correction performance than hard-decision FEC (decoding).

In some embodiments, the FEC decoding unit 251 may iteratively FEC decode the data packet's regenerated FEC encoded payload portion. A number of iterations may be increased, if a data packet, which is received subsequently to the actually processed data packet, is not forwarded to the decoding unit 251. The increased number of FEC decoding iterations may provide improved error correction for the payload portion.

In other words, the FEC decoder in the drop path may apply a variable number of iterations. If a subsequent packet is forwarded, the packet currently processed may be processed using a higher number of iterations leading to improved performance. For packets transmitted over longer distances, a network management may optionally reserve a subsequent slot for a forwarding packet.

The FEC decoded payload portion may be provided to a network element or a network 530 connected to the regenerative network node 250-1. For example, the network 530 may be a local access network at a location C, like a local DSL network.

The processing unit 230 forwards the data packet's regenerated FEC encoded payload portion to switching element 262, if the extracted destination information indicates that the data packet's destination is not the regenerative network node 250-1. For example, if the extracted destination information indicates that the data packet's destination is the PoP 502 at location B or the other regenerative network node 250-2, the switching element 262 may direct the data packet's regenerated FEC encoded payload portion from input processing line 280 to output processing line 290.

The signal regeneration unit 220 may optionally mitigate signal impairments of the first link portion 198 in the data packet's header portion to provide a regenerated header portion. The regenerated header portion may further be provided to the switching element 262. The switching element 262 may direct the data packet's (regenerated) header portion together with the data packet's regenerated FEC encoded payload portion from the input processing line 280 to the output processing line 290.

In the outbound direction, i.e., if the data packet's regenerated FEC encoded payload portion (and optionally the data packet's header portion) is directed from the input processing line 280 to the output processing line 290 by the switching element 262, the data packet's regenerated FEC encoded payload portion (and optionally the data packet's header portion) is input to DSP 263 as encoded digital electrical signal. The DSP 263 may perform further signal operations on the outbound encoded digital electrical signal. An example for such an operation may be modulation, such as DP-QPSK or DP-QAM, or pre-compensation of expected impairments in the second link portion 199. The output of the DSP 263 may be input to Digital-to-Analog converter (DAC) 264. The DAC 264 may convert the outbound digital electrical signal into an outbound analog electrical signal. The output of the DAC 264 may be input to the OEO 240, where the E/O 242 may convert the outbound analog electrical signal into an outbound optical signal. The outbound optical signal 300' may then be (re-) transmitted by the OEO 242 to the second link portion 199.

The DSP may optionally modulate the data packet's regenerated FEC encoded payload portion (and optionally the data packet's header portion) with a modulation scheme different from a modulation scheme of the optical signal 300 received from the first optical link portion 198. For example, the received optical signal 300 may be 16 QAM modulated with a symbol rate of 32 GBaud and the outbound optical signal 300' may be 8 QAM modulated with a symbol rate of 43 GBaud. In a further example, the received optical signal 300 may be 16 QAM modulated with a symbol rate of 32 GBaud and the outbound optical signal 300' may be QPSK modulated with a symbol rate of 64 GBaud. Furthermore, hybrid modulation schemes may be used. A bit rate of the received optical signal 300 may be a same as a bit rate of the outbound optical signal 300'. Accordingly, a less complex modulation scheme for the outbound optical signal 300' compared to a modulation scheme of the received optical signal 300 may allow a higher symbol rate for the outbound optical signal 300' compared to the received optical signal 300.

In some embodiments, a bit rate of the received optical signal 300 may be similar to or deviate from a bit rate of the outbound optical signal 300'. For example, a bit rate of the received optical signal 300 may be 5% higher or lower than a bit rate of the outbound optical signal 300'. Accordingly, the DSP 263 may adapt a bit rate of the data packet's regenerated FEC encoded payload portion (and optionally the data packet's header portion) and provide the data packet's regenerated FEC encoded payload portion (and optionally the data packet's header portion) with a bit rate different from a bit rate of the optical signal 300 received from the first optical link portion 198.

The OEO 240 may provide, to the second optical link portion 199, the outbound optical signal 300' with a wavelength different from a wavelength of the optical signal 300 received from the first optical link portion 198.

The wavelength and the modulation may be adapted to specific characteristics of the second optical link portion 199, e.g., to a length of the second optical link portion 199.

In other words, in the DSP 263 the incoming data/packets may be re-modulated. The modulation format may differ from the modulation format of the received data. The bitrate of the output signal and the input signal may be the same. As an example, the following combinations may be used: Input 16 QAM @ 32 GBaud-Output 8 QAM @ 43 GBaud; Input 16 QAM @ 32 GBaud-Output QPSK @ 64 GBaud. Combinations using hybrid formats may be used, too.

Via the second optical link portion 199, the outbound optical signal 300' may be provided to the other regenerative network node 250-2. The apparatus 500-2 included in the regenerative network node 250-2 may perform a same or similar processing on the optical signal 300' as the apparatus 500-1.

Figure 6:
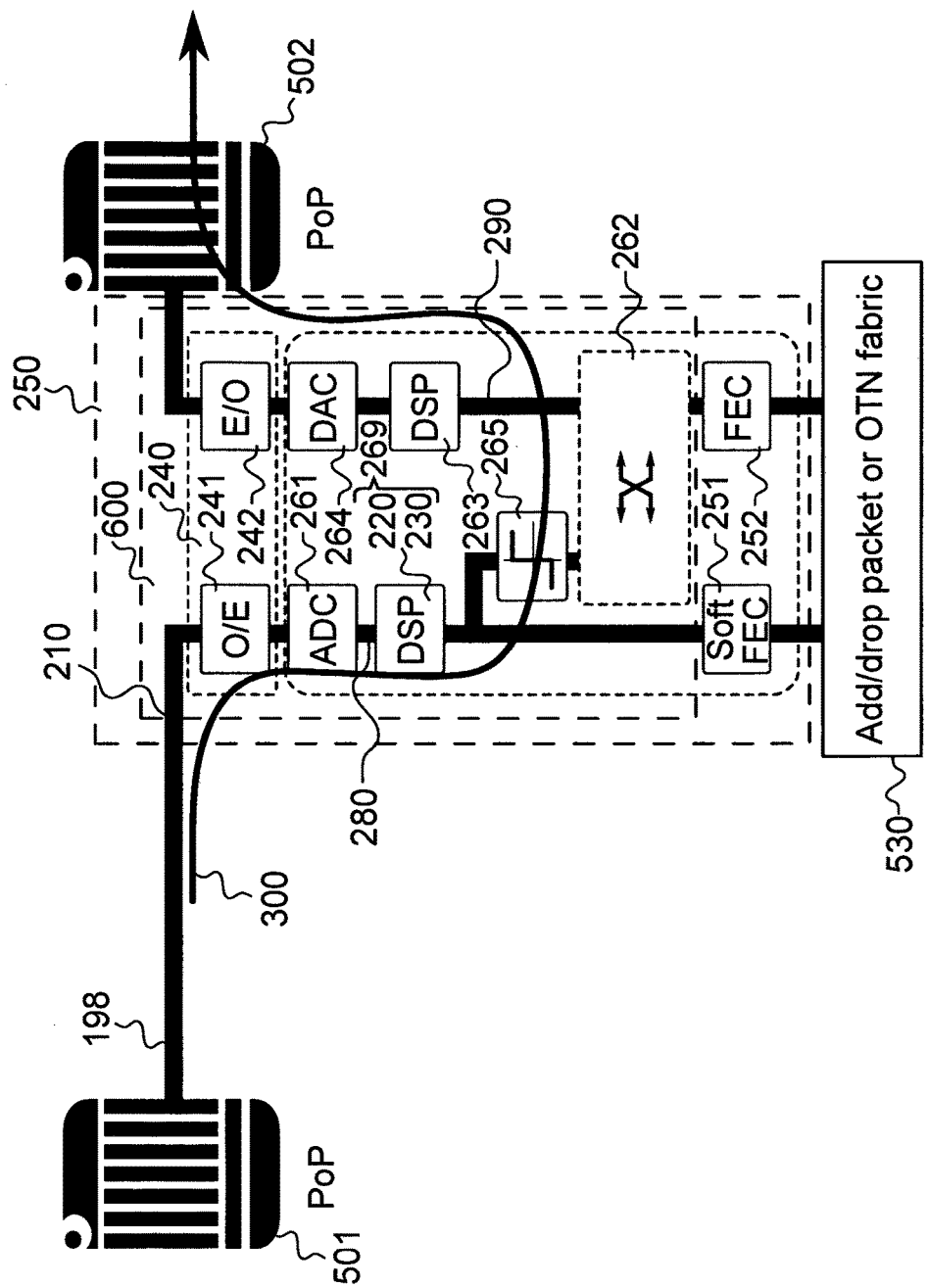
FIG. 6 illustrates an example of an apparatus based on the example illustrated in FIG. 2.

FIG. 6 illustrates another example of an apparatus 600. The apparatus 600 is to some extend similar to the apparatus 500-1 illustrated in FIG. 5. However, in contrast to the apparatus 500-1 illustrated in FIG. 5, a reduction unit 265 is provided between processing unit 230 and the switching element 262. The reduction unit 265 may reduce a number of bits representing the data packet's regenerated FEC encoded payload portion, if the data packet's regenerated FEC encoded payload portion is forwarded to the second link portion 199 via the switching element 262.

The reduction unit 265 may account for the fact that an FEC encoded symbol of the data packet's regenerated FEC encoded payload portion is provided as a soft value by the signal regeneration unit 220. A soft value may take on a whole range of values in-between a fixed set of possible values. On the contrary, a hard value may only take one value of the fixed set of possible values. For example, "0" and "1" may be the fixed set of possible values in a binary case. Accordingly, any value between "0" and "1" may be regarded as soft value.

For example, assuming that the received optical signal 300 has a symbol rate of 200 GBaud and that each symbol is represented by 6 bits at the output of the signal regeneration unit 220, the signal regeneration unit 220 provides approx. 1.5 Tbit/s of data (incl. overhead). Accordingly, the switching element 262 would have to direct approx. 1.5 Tbit/s from the input processing line 280 to the output processing line 290. In order to reduce a load on the switching element 262, the reduction unit 265 may reduce a number of bits representing the data packet's regenerated FEC encoded payload portion.

In some embodiments, the reduction unit 265 may determine a hard value for the FEC encoded symbol by comparing the soft value to a threshold. For example, a soft value may be compared to "0.5" in the binary case. If the soft value is equal to or larger than the threshold value "0.5", "1" may be determined as hard value for the FEC encoded symbol. If the soft value is smaller than the threshold value "0.5", "0" may be determined as hard value for the FEC encoded symbol. Continuing the above example, the 1.5 Tbit/s of data provided by the regeneration unit 220 may be reduced to approx. 256 Gbit/s by the reduction unit 265, assuming that the hard value for the FEC encoded symbol is represented by one bit.

Moreover, the reduction unit 265 may allow to reduce noise. The soft value output by the regeneration unit 220 deviates to some extent from, e.g., "0" or "1" in the binary case due to noise. Determining a hard decision for the soft value may allow to remove the noise. Without the reduction unit 265 noise might accumulate, if the symbol is transmitted over a plurality of apparatuses 600. The hard value may be erroneous for some FEC encoded symbols. However, the ratio of erroneous hard values may be very low and may be compensated at a receiver's decoding unit using, e.g., appropriately modified log-likelihood ratios for estimating a received symbol's value.

In other words, data forwarding may mean forwarding of data output by DSP 269. At the output of the DSP 269 soft values may be provided, i.e., noisy constellation points. The individual I and Q values may have a remarkable resolution and the following switch should thus have a remarkable resolution. The remarkable resolution may require a high complexity of this switch, e.g., for 200 GBaud at 6 bit resolution plus overhead approx. 1.5 Tbit/s. Hence, a hard decision may be included in the forwarding path. The hard decision may force noise compression, but errors may be "frozen". The switch complexity may, e.g., be reduced by a factor of 6 to 256 Gbit/s.

Figure 7:
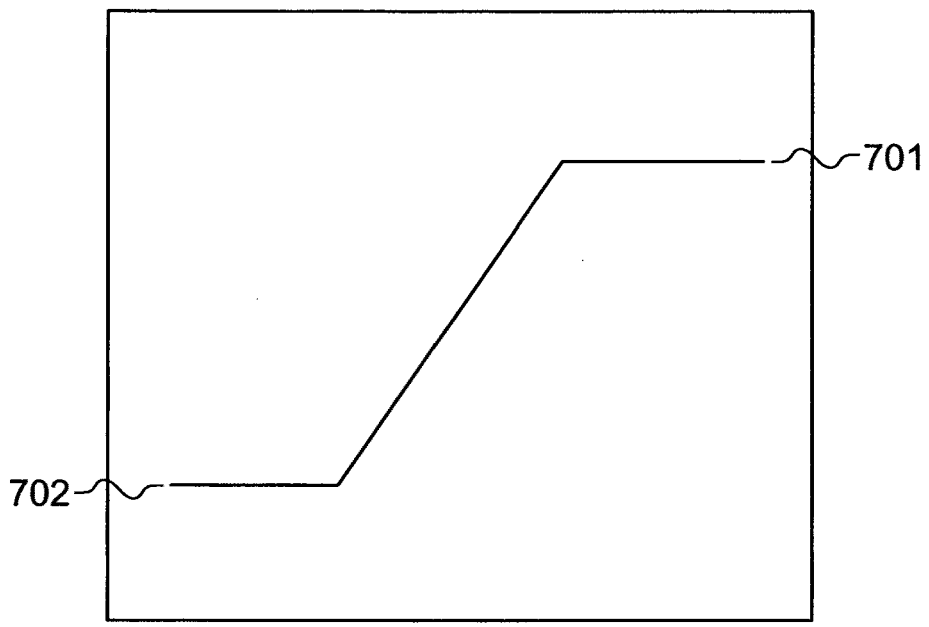
FIG. 7 illustrates an example of limiting a soft value's amplitude.
Figure 8:
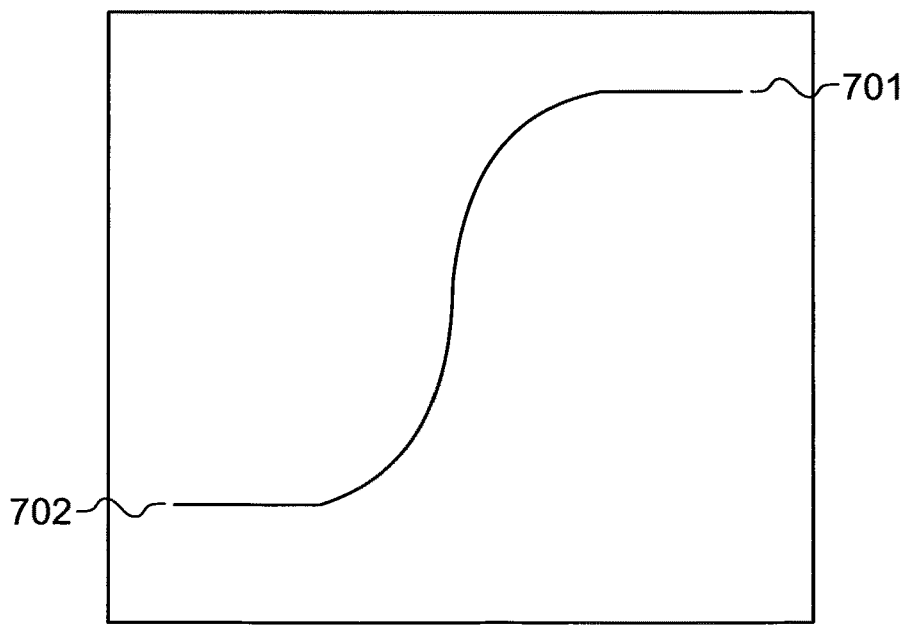
FIG. 8 illustrates another example of limiting a soft value's amplitude.

The reduction unit 265 may alternatively reduce an amplitude of the soft value to a predefined maximum value. FIG. 7 and FIG. 8 illustrate examples of limiting the soft value's amplitude.

FIG. 7 and FIG. 8 illustrate examples of a transfer characteristic of the reduction unit 265. The amplitude of the FEC encoded symbol's soft value may, e.g., be limited to an amplitude which lies within an upper amplitude limit 701 and a lower amplitude limit 702.

For example, as illustrated in FIG. 7, a transfer characteristic of the reduction unit 265 may saturate at the upper amplitude limit 701 and the lower amplitude limit 702, and have a linear relationship in between. In some embodiments, as illustrated in FIG. 8, a transfer characteristic of the reduction unit 265 may saturate at the upper amplitude limit 701 and the lower amplitude limit 702, and have a sigmoid relationship in between.

Limiting the amplitude of the FEC encoded symbol's soft value may allow to reduce noise, since the limited amplitude of the FEC encoded symbol's soft value is accompanied by a reduced noise component of the FEC encoded symbol's soft value. Moreover, amplitude values within the upper amplitude limit 701 and the lower amplitude limit 702 may be represented using a reduced number of bits compared to the number of bits used for representing the original amplitude of the FEC encoded symbol's soft value. Hence, limiting an amplitude of the FEC encoded symbol's soft value may allow to reduce an amount of data provided to the switching element 262.

In other words, instead of determining a hard decision, alternative transfer characteristics like single side clipping may be used for the reduction unit 265 to squeeze the noise and/or to reduce the resolution of data for forwarding. The transfer characteristics may base on full resolution or reduced resolution of data.

Figure 9:
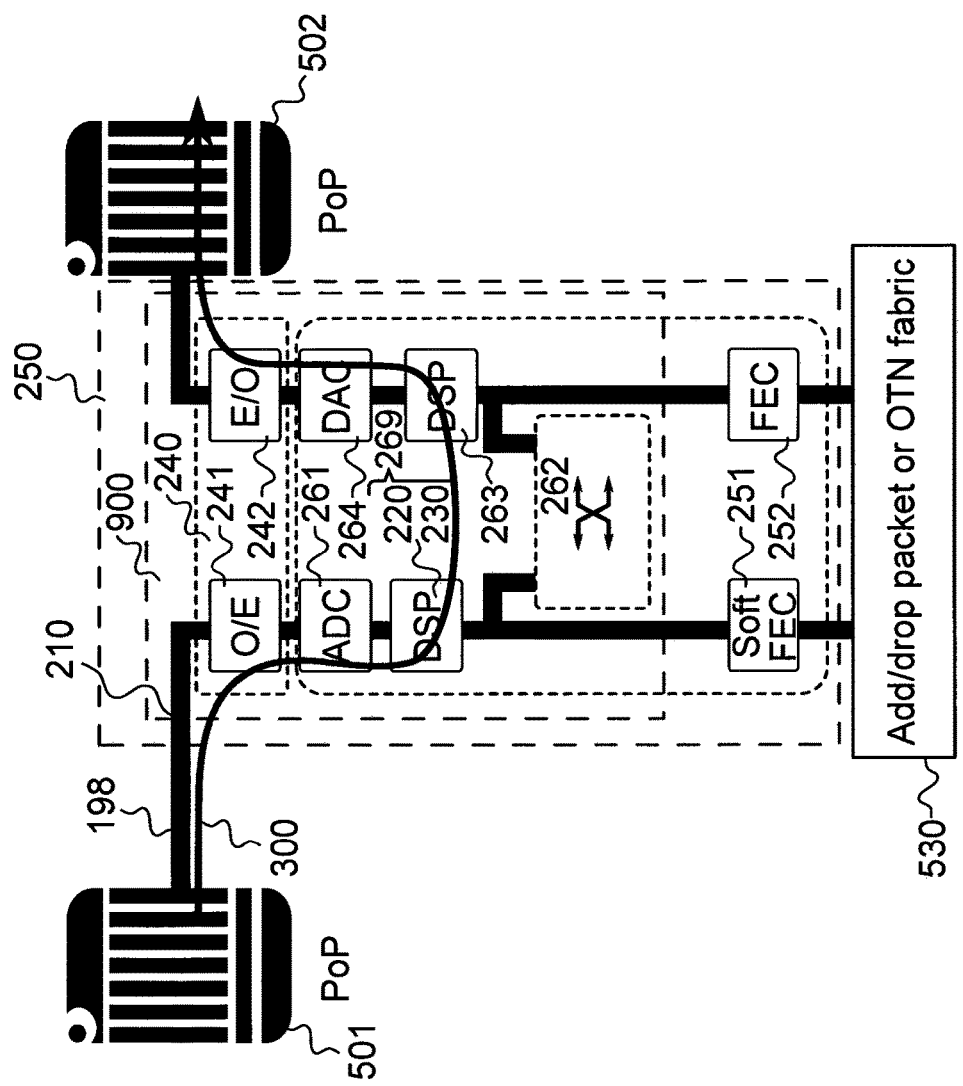
FIG. 9 illustrates another example of an apparatus based on the example illustrated in FIG. 2.

FIG. 9 illustrates another example of an apparatus 900. The apparatus 900 is to some extend similar to the apparatus 500-1 illustrated in FIG. 5 and the apparatus 600 illustrated in FIG. 6. However, in contrast to the apparatus 500-1 illustrated in FIG. 5 and the apparatus 600 illustrated in FIG.

6, the signal regeneration unit 220 provides the regenerated FEC encoded payload portion with less mitigated signal impairments, if the data packet's regenerated FEC encoded payload portion is forwarded to the second link portion 199 via the switching element 262, compared to the case where the extracted destination information indicates that the data packet's destination is the regenerative network node 250, i.e., if the data packet's regenerated FEC encoded payload portion is forwarded to the decoding unit 251 of the regenerative network node 250.

For example, the regeneration unit 220 may omit estimating and correcting a frequency offset of the data packet's regenerated FEC encoded payload portion, if the data packet's regenerated FEC encoded payload portion is forwarded to the switching element 262. The regeneration unit 220 may, e.g., further or alternatively omit estimating and correcting a frequency offset of the data packet's regenerated FEC encoded payload portion, if the data packet's regenerated FEC encoded payload portion is forwarded to the switching element 262. However, alternatively or additionally, also other steps of the regeneration processing in the regeneration unit 220 may be omitted.

In some embodiments, where the regeneration unit 220 provides a regenerated header portion, also the regenerated header portion may be provided with less mitigated signal impairments, if the data packet's regenerated FEC encoded payload portion is forwarded to the switching element 262, compared to the case the data packet's regenerated FEC encoded payload portion is forwarded to the decoding unit 251 of the regenerative network node 250.

Despite omitting, e.g., the frequency—and/or phase offset correction, linear impairments of the first link portion 199 may be compensated. However, the overall quality of the regenerated FEC encoded payload portion may be inferior compared to a regenerated FEC encoded payload portion which is provided using, e.g., frequency—and phase offset correction.

However, providing the regenerated FEC encoded payload portion with less mitigated signal impairments may allow to reduce a processing time of the data packet received from the first link portion 198. Accordingly, a latency of a transmission path including one or more apparatuses 900 may be reduced. Furthermore, power consumption for forwarding a received data packet to the second link portion 199 may be reduced compared to a situation where full regeneration processing is performed on the data packet.

Although not illustrated in FIG. 9, the apparatus 900 may comprise a reduction unit similar to the reduction unit 265 illustrated in FIG. 6. The reduction unit may be arranged between the DSP 269 and the switching element 262.

In other words, DSP 269 may be omitted partially in case of forwarding of data.

Figure 10:
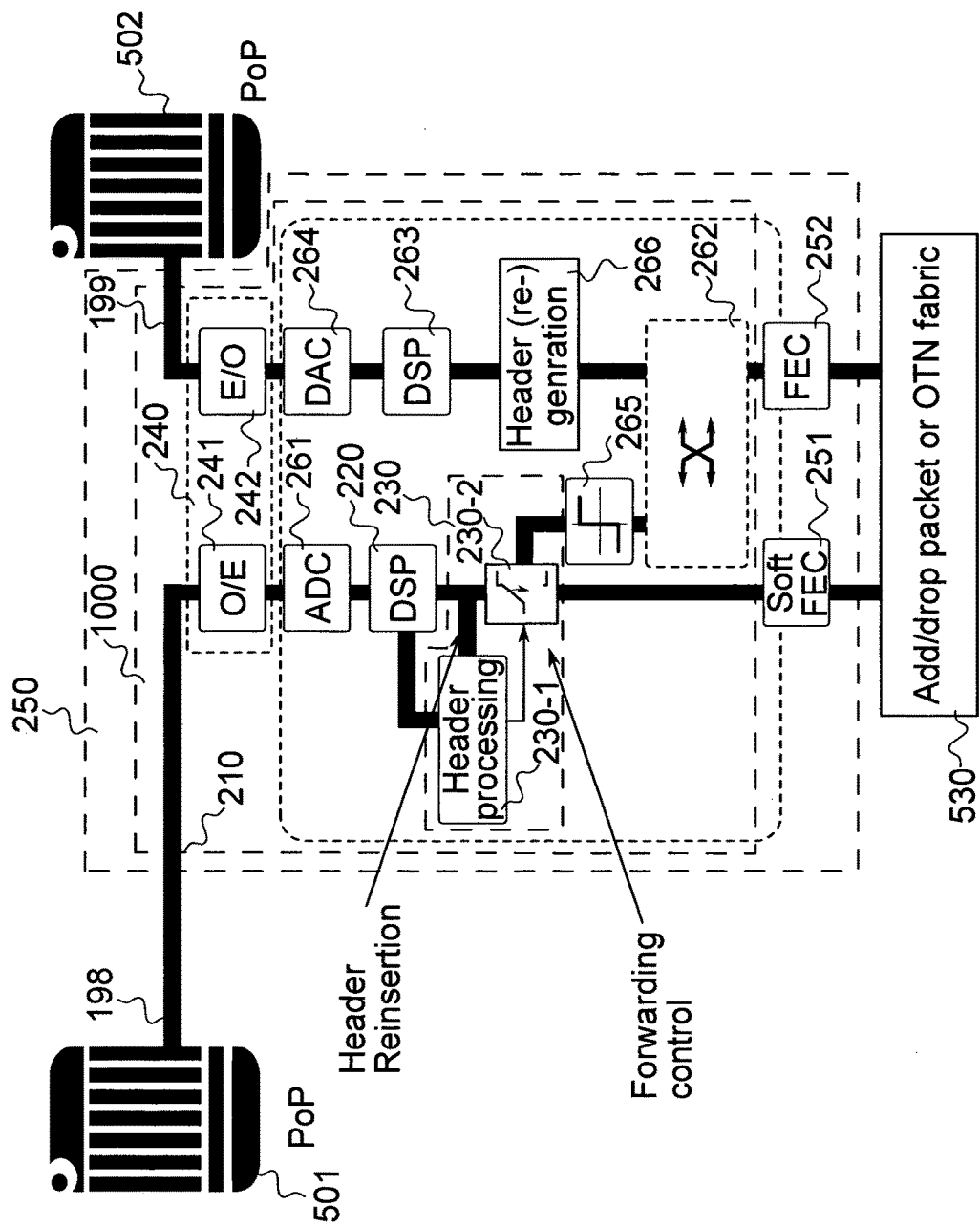
FIG. 10 illustrates another example of an apparatus based on the example illustrated in FIG. 2.

FIG. 10 illustrates another example of an apparatus 1000. The apparatus 1000 is to some extend similar to the apparatus 500-1 illustrated in FIG. 5, the apparatuses 600 illustrated in FIG. 6 and the apparatus 900 illustrated in FIG. 9. However, in contrast to the apparatus 500-1 illustrated in FIG. 5, the apparatuses 600 illustrated in FIG. 6 and the apparatus 900 illustrated in FIG. 9, the apparatus 1000 illustrated in FIG. 10 comprises the regeneration unit 220 and the processing unit 230 as single elements.

For example, some of the regeneration processes may be applied jointly to the data packet's FEC encoded payload portion and the data packet's header portion in the regeneration unit 220. However, processing unit 230 may perform at least partly a separate regeneration processing on the data packet's header portion. For example, a header processing unit 230-1 of the processing unit 230 may perform, on the header portion, any processing to mitigate signal impairments of the first link portion 198 the regeneration unit 220 performs on the data packet's FEC encoded payload portion. In particular, the header processing unit 230-1 may, e.g., perform a separate blind channel estimation, a separate polarization alignment and/or a separate error correction on the header portion. Furthermore, the header processing unit 230-1 may FEC decode the header portion using the estimated channel information, if the header portion is FEC encoded. The header processing unit 230-1 further extracts the destination information given in the data packet's header portion.

The processing unit 230 may further comprise a switching unit 230-2, which forwards the data packet's regenerated FEC encoded payload portion either to the decoding unit 251 or the switching element 262 based on the destination indicated by the extracted destination information.

The separate header processing may allow to provide, to the switching unit 230-2, the extracted destination information related to the regenerated FEC encoded payload portion before or simultaneously to the regenerated FEC encoded payload portion. Providing the extracted destination information before or simultaneously to the regenerated FEC encoded payload portion may omit buffering the regenerated FEC encoded payload portion. For example, if the extracted destination information is provided to the switching unit 230-2 subsequent to the regenerated FEC encoded payload portion, the regenerated FEC encoded payload portion needs to be buffered since the switching unit 230-2 is not able to forward the regenerated FEC encoded payload portion without the extracted destination information. For example, if 1 Tbit/s of data related to the regenerated FEC encoded payload portion is provided by the regeneration unit 220 to the switching unit 230-2, 1 Mbit/s of data needs to be buffered if the extracted destination information is provided to the switching unit 230-2 1 µs later in time than the regenerated FEC encoded payload portion.

In some embodiments, where the data packet's header portion is FEC encoded and FEC decoding of the FEC encoded header portion is performed by the header processing unit 230-1, providing the extracted destination information to the switching unit 230-2 may take a comparatively long time since FEC decoding the FEC encoded header portion may be time-consuming. Hence, a short header, i.e., a header holding as little information as necessary, may be used. Furthermore, the chosen FEC may use a code which can be decoded rather quickly.

In other words, the header may be tapped out at an intermediate point of the signal processing chain or at its end. After passing the DSP partly, a separate header processing unit may be used. This unit may, e.g., contain separate channel equalization, polarization alignment, error correction and/or forward error correction. The header processing unit may control the forwarding switch.

The apparatus 1000 illustrated in FIG. 10 may further comprise a header unit 266. The header unit may convert a destination information given in a second format, which is different from a first format, in a header portion of a data packet for the second link portion 199 to the first format and FEC encode the header portion of the data packet for the second link portion 199.

For example, the regenerative network node 250 may provide a data packet to the output processing line 290 for providing the data packet to the second link portion 199. The data packet may, e.g., originate from the access network 530 which is connected to the regenerative network node 250.

For example, the payload portion of the packet originating from the access network 530 may be FEC encoded by encoding unit 252. The data packet including the FEC encoded payload portion may be provided to the header unit 266.

For example, the header portion of the data packet may comprise a Medium Access Control (MAC) address (second data format) destining a destination of the data packet. However, a processing unit 230 of a subsequent apparatus 1000 connected to the second link portion 199 may expect destination information given in the data packet's header in the first data format different from the MAC address. For example, the first data format may comprise a local bus address of a destined network element, like another regenerative network or the PoP 502 connected to the second link portion. Accordingly, the header unit 266 may convert, e.g., the MAC address given in the data packet's header portion to the first data format, e.g., the local bus address. Furthermore, the header unit 266 may FEC encode the header portion.

In case a data packet is provided to the header unit 266 without a header portion, the header unit 266 may generate a header portion, containing at least destination information indicating a data packet's destination in the first data format, on the basis of information given in the data packet's payload portion, information provided to the header unit 266 by the regenerative network node 250, or information provided by a higher layer network management entity.

Although not illustrated in FIG. 10, the signal regeneration unit 220 may provide the regenerated FEC encoded payload portion with less mitigated signal impairments, if the data packet's regenerated FEC encoded payload portion is forwarded to the second link portion 199 via the switching element 262, similar to the embodiment illustrated in FIG. 9.

Figure 11:
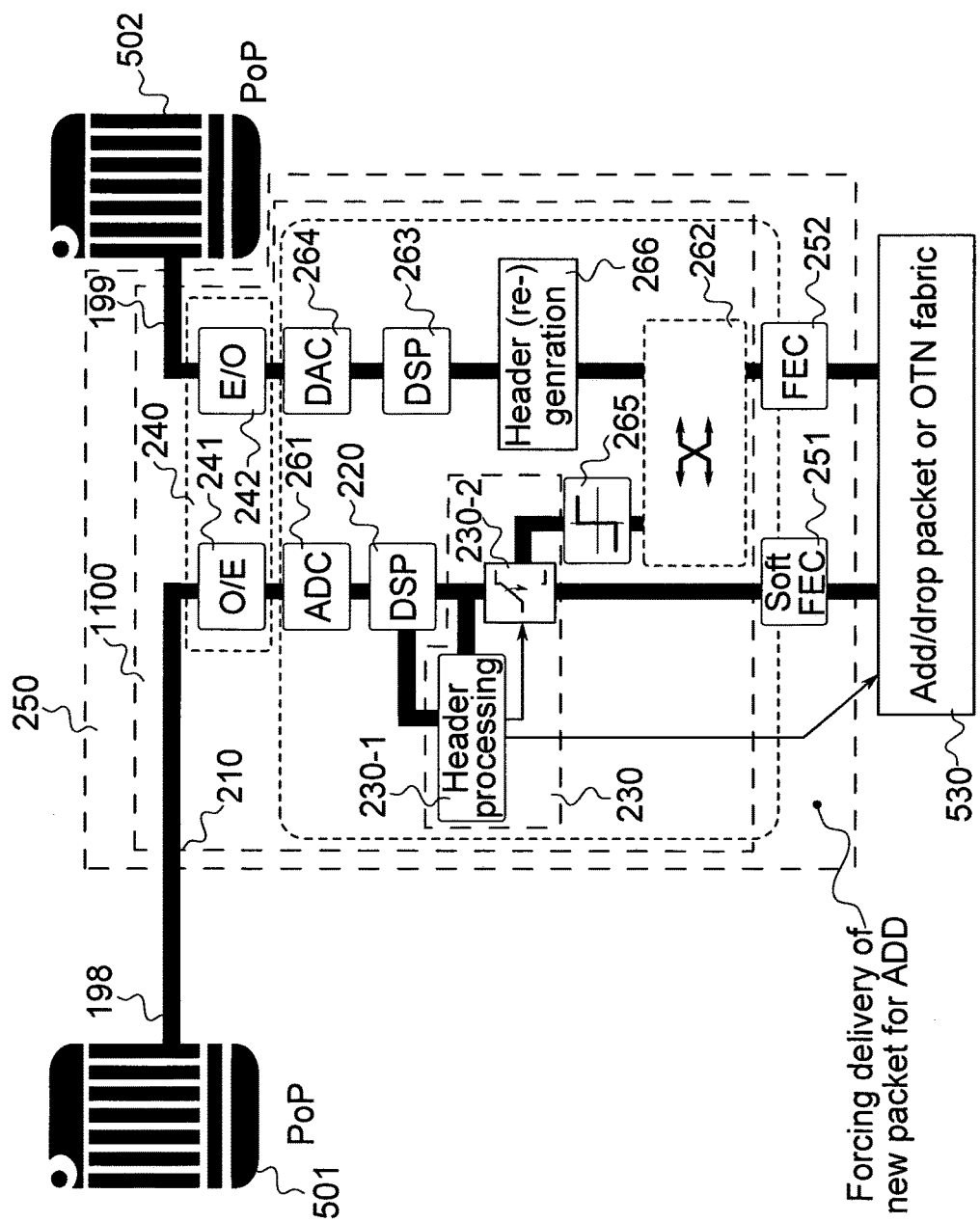
FIG. 11 illustrates another example of an apparatus based on the example illustrated in FIG. 10.

FIG. 11 illustrates another example of an apparatus 1100. The apparatus 1100 is to some extend similar to the apparatus 1000 illustrated in FIG. 10. However, if the data packet included in the signal received from the first link portion 198 is empty, the apparatus is configured to provide, to the second link portion 199 in a time frame associated to the empty data packet, a data packet provided via the regenerative network node 250 with an FEC encoded payload portion and a header portion. Moreover, if the extracted destination information indicates that the destination of the data packet included in the signal received from the first link portion 198 is the regenerative network node 250, the apparatus 1100 is configured to provide, to the second link portion 199 in a time frame associated to the data packet included in the signal received from the first link portion 198, a data packet provided via the regenerative network node 250 with an FEC encoded payload portion and a header portion.

In particular, the header processing unit 230-1 may request a data packet from the regenerative network node 250, if the extracted destination information indicates that the destinction of the data packet received from the first link portion 198 is the regenerative network node 250 or if the data packet included in the signal received from the first link portion 198 is empty. The information that the received data packet is empty may be provided to the header processing unit 230-1 by the regeneration unit 220. The requested data packet may, e.g., originate from the access network 530 connected to the regenerative network node 250. The packet may be provided to the apparatus 1100 via the regenerative network node 250. The data packet may have a same temporal length as the received empty data packet or the received data packet which destination is the regenerative network node 250. Accordingly, provision of empty data packets or dummy payload to the second link portion 199 may be avoided. Hence, dummy traffic in a network comprising one or more regenerative networks 250 including the apparatus 1100 may be avoided.

In other words, the header processing unit may force the delivery of a new packet to add if a packet is dropped or an empty packet is received.

In embodiments the signal regeneration unit 220, the processing unit 230, the header processing unit 230-1, the switching unit 230-2, the decoding unit 251, the encoding unit 252, the switching element 262, the reduction unit 265 and the header unit 266 may be implemented using one or more processing units, one or more processing devices, any means for processing, such as a processor, a computer or a programmable hardware component being operable with accordingly adapted software. In other words, the described functions of the signal regeneration unit 220, the processing unit 230, the header processing unit 230-1, the switching unit 230-2, the decoding unit 251, the encoding unit 252, the switching element 262, the reduction unit 265 and the header unit 266 may as well be implemented in software, which is then executed on one or more programmable hardware components. Such hardware components may comprise a general purpose processor, a Digital Signal Processor (DSP), a micro-controller, etc.

A processing unit, a processing device or a processor may be any electronic circuitry that carries out the instructions of a computer program by performing basic arithmetic, logical, control and input/output (I/O) operations specified by the instructions. The processing unit, processing device or processor may comprises one or more inputs and one or more outputs. The one or more inputs may receive control signals, voltages or currents from one or more other devices. Furthermore, supply power may be provided to one or more of the inputs. The processing unit, processing device or processor may output processing results or intermediate results via one or more of the outputs to other elements. The processing unit, processing device or processor may output control signals, voltages or currents via the one or more outputs. The processing unit, processing device or processor may further include internal memory and/or be connectable to external memory.

Figure 12:
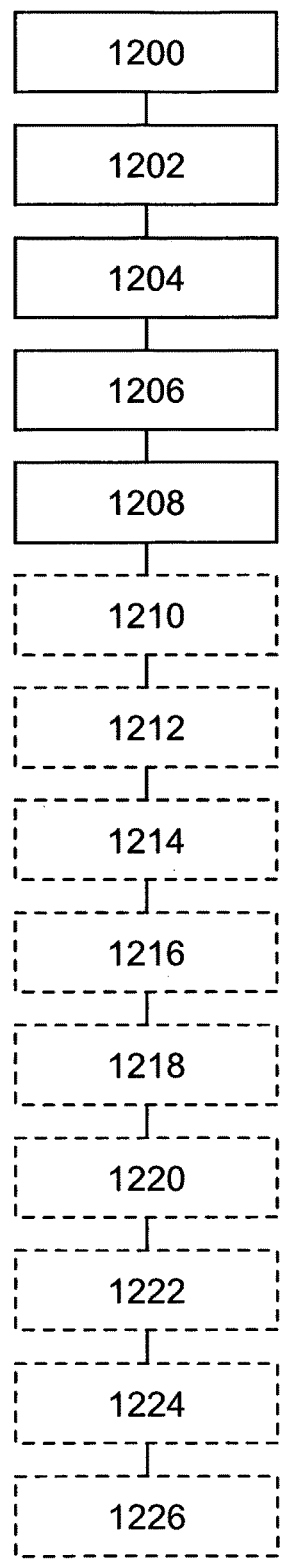
FIG. 12 illustrates a flowchart of an example of a method for a regenerative network node between a first and a second link portion.

FIG. 12 illustrates by means of a flowchart an example of a method for a regenerative network node between a first and a second link portion. The method comprises receiving 1200, from the first link portion, a signal impaired by the first link portion, the signal including a data packet with a FEC encoded payload portion and a header portion. Furthermore, the method comprises mitigating 1202 signal impairments of the first link portion to provide a regenerated FEC encoded payload portion. The method further comprises extracting 1204 destination information given in the data packet's header portion. If the extracted destination information indicates that the data packet's destination is the regenerative network node, the method comprises forwarding 1206 the data packet's regenerated FEC encoded payload portion to a decoding unit of the regenerative network node. Else, the method comprises forwarding 1208 the data packet's regenerated FEC encoded payload portion to the second link portion.

Optionally, the method may comprise converting 1210 an optical input signal received from the first optical link portion to an electrical input signal and provide the electrical input signal to the signal regeneration unit, and converting 1212 an electrical output signal to an optical output signal for the second optical link portion.

The method may optionally comprise providing 1214, to the second optical link portion, the optical signal with a wavelength different from a wavelength of the optical signal received from the first optical link portion.

Optionally, the method may comprise reducing 1216 a number of bits representing the data packet's regenerated FEC encoded payload portion, if the data packet's regenerated FEC encoded payload portion is forwarded to the second link portion. If an FEC encoded symbol of the data packet's regenerated. FEC encoded payload portion is represented by a soft value, reducing 1216 may comprise determining a hard value for the FEC encoded symbol by comparing the soft value to a threshold. Reducing 1216 may further comprise limiting an amplitude of the soft value to a predefined maximum value.

The method may optionally comprise providing 1218 the regenerated FEC encoded payload portion with less mitigated signal impairments, if the data packet's regenerated. FEC encoded payload portion is forwarded to the second link portion, compared to the case where the extracted destination information indicates that the data packet's destination is the regenerative network node.

If the header portion is an FEC encoded header portion, extracting 1204 the destination information given in the FEC encoded header portion may optionally comprise FEC decoding the FEC encoded header portion. The extracted destination information related to the regenerated FEC encoded payload portion may be provided before or simultaneously to the regenerated FEC encoded payload portion by the method.

If the data packet included in the signal received from the first link portion is empty, the method may optionally comprise providing 1220, to the second link portion in a time frame associated to the empty data packet, a data packet provided via the regenerative network node with an FEC encoded payload portion and a header portion.

If the extracted destination information indicates that the destination of the data packet included in the signal received from the first link portion is the regenerative network node, the may optionally comprise providing 1222, to the second link portion in a time frame associated to the data packet included in the signal received from the first link portion, a data packet provided via the regenerative network node with an FEC encoded payload portion and a header portion.

If the destination information is given in a first format in the header portion of the data packet included in the signal received from the first link portion, the method may optionally comprise converting 1224 a destination information given in a second format, which is different from the first format, in a header portion of a data packet for the second link portion to the first format and FEC encode the header portion of the data packet for the second link portion.

The method may optionally comprise modulating 1226 a data packet for the second link portion with a modulation scheme different from a modulation scheme of the signal received from the first link portion.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "unit" (performing a certain function) shall be understood as functional blocks comprising circuitry that is adapted for performing a certain function, respectively. Hence, a "unit" may as well be understood as a "unit being adapted or suited for s.th.". A unit being adapted for performing a certain function does, hence, not imply that such means necessarily is performing said function (at a given time instant).

Functions of various elements shown in the figures, including any functional blocks labeled as "unit", "module . . . ", " . . . ", etc., may be provided through the use of dedicated hardware, such as " . . . ", " . . . ", "a processor", "a controller", etc. as well as hardware capable of executing software in association with appropriate software. Moreover, any entity described herein as "unit", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An apparatus for a regenerative network node between a first and a second link portion, comprising:

an input configured to receive, from the first link portion, a signal impaired by the first link portion, the signal including a data packet with a Forward Error Correction (FEC) encoded payload portion and a header portion;

a signal regeneration unit configured to mitigate signal impairments of the first link portion to provide a regenerated FEC encoded payload portion;

a processing unit configured to
extract destination information given in the data packet's header,
if the extracted destination information indicates that the data packet's destination is the regenerative network node,
forward the data packet's regenerated FEC encoded payload portion to a decoding unit of the regenerative network node,
else,
forward the data packet's regenerated FEC encoded payload portion to the second link portion; and a reduction unit configured to reduce a number of bits representing the data packet's regenerated FEC encoded payload portion, if the data packet's regenerated FEC encoded payload portion is forwarded to the second link portion.

2. The apparatus of claim 1, wherein the signal regeneration unit is configured to mitigate the signal impairments without FEC decoding the FEC encoded payload portion.

3. The apparatus of claim 1, wherein
the first link portion and the second link portion are optical link portions; and
the apparatus comprises an optical-electrical-optical conversion unit configured to
convert an optical input signal received from the first optical link portion to an electrical input signal and provide the electrical input signal to the signal regeneration unit, and
convert an electrical output signal to an optical output signal for the second optical link portion.

4. The apparatus of claim 3, wherein the optical-electrical-optical conversion unit is configured to provide, to the second optical link portion, the optical signal with a wavelength different from a wavelength of the optical signal received from the first optical link portion.

5. The apparatus of claim 1, wherein
an FEC encoded symbol of the data packet's regenerated FEC encoded payload portion is represented by a soft value; and
the reduction unit is configured to determine a hard value for the FEC encoded symbol by comparing the soft value to a threshold.

6. The apparatus of claim 1, wherein
an FEC encoded symbol of the data packet's regenerated FEC encoded payload portion is represented by a soft value; and
the reduction unit is configured to limit an amplitude of the soft value to a predefined maximum value.

7. The apparatus of claim 1, wherein
the header portion is an FEC encoded header portion;
the processing unit is configured to extract the destination information given in the FEC encoded header portion using FEC decoding; and
the apparatus is configured to provide the extracted destination information related to the regenerated FEC encoded payload portion before or simultaneously to the regenerated FEC encoded payload portion.

8. The apparatus of claim 1, wherein
if the data packet included in the signal received from the first link portion is empty, the apparatus is configured to provide, to the second link portion in a time frame associated to the empty data packet, a data packet provided via the regenerative network node with an FEC encoded payload portion and a header portion; and
if the extracted destination information indicates that the destination of the data packet included in the signal received from the first link portion is the regenerative network node, the apparatus is configured to provide, to the second link portion in a time frame associated to the data packet included in the signal received from the first link portion, a data packet provided via the regenerative network node with an FEC encoded payload portion and a header portion.

9. The apparatus of claim 1, wherein
the destination information is given in a first format in the header portion of the data packet included in the signal received from the first link portion; and
the apparatus further comprises a header unit configured to convert a destination information given in a second format, which is different from the first format, in a header portion of a data packet for the second link portion to the first format and FEC encode the header portion of the data packet for the second link portion.

10. The apparatus of claim 1, wherein the apparatus is configured to modulate a data packet for the second link portion with a modulation scheme different from a modulation scheme of the signal received from the first link portion.

11. An apparatus for a regenerative network node between a first and a second link portion, comprising:
an input configured to receive, from the first link portion, a signal impaired by the first link portion, the signal including a data packet with a Forward Error Correction (FEC) encoded payload portion and a header portion;
a signal regeneration unit configured to mitigate signal impairments of the first link portion to provide a regenerated FEC encoded payload portion; and
a processing unit configured to
extract destination information given in the data packet's header portion,
if the extracted destination information indicates that the data packet's destination is the regenerative network node,
forward the data packet's regenerated FEC encoded payload portion to a decoding unit of the regenerative network node,
else,
forward the data packet's regenerated FEC encoded payload portion to the second link portion,
wherein the signal regeneration unit is configured to provide the regenerated FEC encoded payload portion with less mitigated signal impairments, if the data packet's regenerated FEC encoded payload portion is forwarded to the second link portion, compared to the case where the extracted destination information indicates that the data packet's destination is the regenerative network node.

12. A network system for transmitting a signal including a data packet with a Forward Error Correction (FEC) encoded payload portion and a header portion, comprising:
a core network;
an intermediate network comprising two or more regenerative network nodes including a respective apparatus according to claim 1,
wherein the regenerative network nodes are connected in series via link portions and a first network node and a last network node of the series of regenerative network nodes is connected to the core network via a link portion, respectively; and wherein at least one of the regenerative network nodes comprises a decoding unit configured to provide a decoded payload portion by FEC decoding a regenerated FEC encoded payload portion forwarded to the decoding unit by the apparatus; and wherein the at least one regenerative network node is further connected to an associated access network and is configured to provide the decoded payload portion to the associated access network.

13. A method for a regenerative network node between a first and a second link portion, comprising:

receiving, from the first link portion, a signal impaired by the first link portion, the signal including a data packet with a Forward Error Correction (FEC) encoded payload portion and a header portion;

mitigating signal impairments of the first link portion to provide a regenerated FEC encoded payload portion;

extracting destination information given in the data packet's header portion;

if the extracted destination information indicates that the data packet's destination is the regenerative network node, forwarding the data packet's regenerated FEC encoded payload portion to a decoding unit of the regenerative network node, else, forwarding the data packet's regenerated FEC encoded payload portion to the second link portion; and reducing a number of bits representing the data packet's regenerated FEC encoded payload portion, if the data packet's regenerated FEC encoded payload portion is forwarded to the second link portion.

14. A method for a regenerative network node between a first and a second link portion, comprising:

receiving, from the first link portion, a signal impaired by the first link portion, the signal including a data packet with a Forward Error Correction (FEC) encoded payload portion and a header portion;

mitigating signal impairments of the first link portion to provide a regenerated FEC encoded payload portion;

extracting destination information given in the data packet's header portion; and if the extracted destination information indicates that the data packet's destination is the regenerative network node, forwarding the data packet's regenerated FEC encoded payload portion to a decoding unit of the regenerative network node, else, forwarding the data packet's regenerated FEC encoded payload portion to the second link portion;

wherein the regenerated FEC encoded payload portion is provided with less mitigated signal impairments, if the data packet's regenerated FEC encoded payload portion is forwarded to the second link portion, compared to the case where the extracted destination information indicates that the data packet's destination is the regenerative network node.

15. A non-transitory computer-readable medium storing computer executable instructions for performing the method of claim 13.

* * * * *